United States Patent [19]

Isborn

[11] Patent Number: 4,483,093
[45] Date of Patent: Nov. 20, 1984

[54] RESTRICTED ANIMAL TRAP

[76] Inventor: Jack E. Isborn, P.O. Box 327, Talmage, Calif. 95481

[21] Appl. No.: 453,144

[22] Filed: Dec. 27, 1982

[51] Int. Cl.³ .......................................... A01M 23/00
[52] U.S. Cl. ............................................. 43/58; 43/61
[58] Field of Search ......................... 43/58, 61, 88, 77

[56] References Cited

U.S. PATENT DOCUMENTS 1,858,096  5/1932  Lementy ................................. 43/58
2,260,872 10/1941  Schmidt ................................. 43/81
4,158,929  6/1979  Custard ................................. 43/58
4,308,682  1/1982  Cesar .................................... 43/88

Primary Examiner—Gene P. Crosby
Attorney, Agent, or Firm—Melvin R. Stidham

[57] ABSTRACT

A racoon trap is disclosed having a housing with a plate slidable along the undersurface of the top wall and pulled by a strong spring across an opening in the top wall. A latch device which holds the slide in set position uncovering the opening, is released only by raising the baited end of a trigger arm to capture only animals that lift their food to eat.

5 Claims, 3 Drawing Figures

RESTRICTED ANIMAL TRAP

BACKGROUND OF THE INVENTION

Certain animals, such as racoons, continue to be pests to farmers by reason of their destruction of vegetation, poultry and small animals. On the other hand, such animals are valuable for their furs as well as for their meat. Accordingly, fur trapping continues to be a flurishing business in some parts of the country, and many cooperative arrangements are made wherein traps are set at scattered points about a farm or ranch to rid the farmer of these pests and to give the trapper the "harvest" of his traps. However, many traps that are effective to capture racoons will also capture and injure small pets, such as dogs.

OBJECTS OF THE INVENTION

It is an object of this invention to provide a racoon trap that cannot be triggered by other animals, including pets.

It is a further object of this invention to provide a trap that will capture only racoons.

Other objects and advantages of this advantage will become apparent from the description to follow, particularly when read in conjunction with the accompanying drawing.

SUMMARY OF THE INVENTION

In carrying out this invention I provide a small housing of steel or the like with a gate that slides across a normally unobstructed opening under the pull of a strong spring to seize an animal's paw which is extended through the opening. The gate can only be triggered by a latch which is pulled upward at its baited end below the opening, as by a racoon that lifts its food to eat. Downward pressure on the latch as would occur if an animal stepped through the opening or pressed downward on the bait, will not trigger the latch.

DESCRIPTION OF A PREFERRED EMBODIMENT

Figure 1:
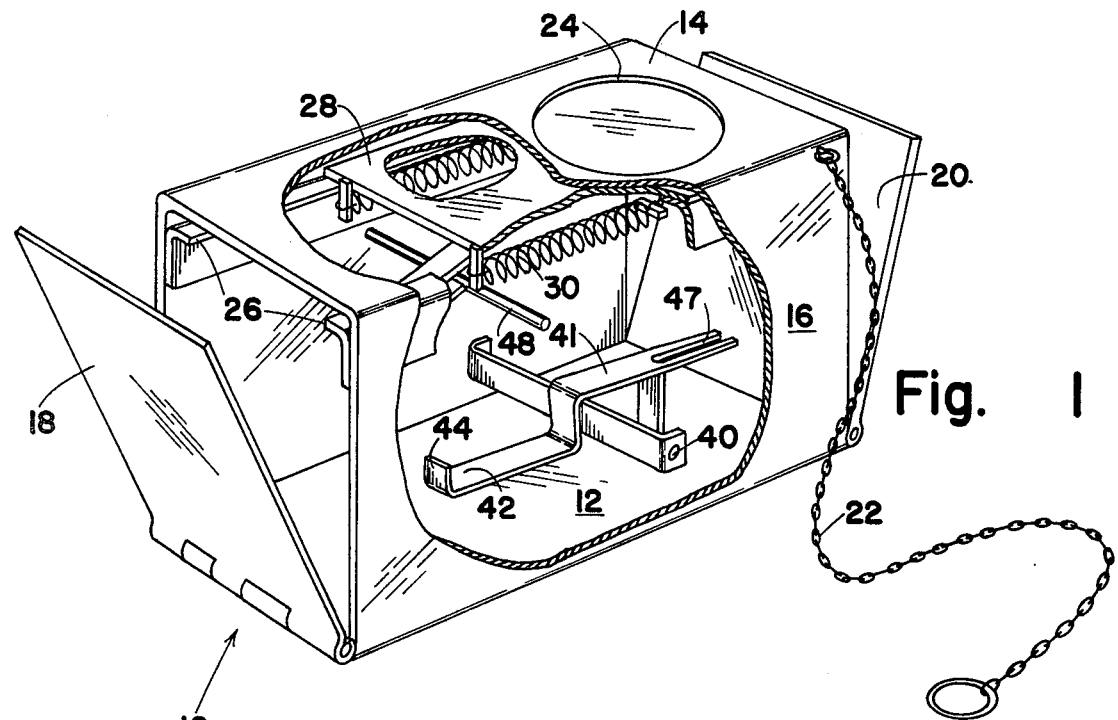
FIG. 1 is a view in perspective, partially broken away, of a racoon trap embodying features of this invention.

Referring now to the drawing with greater particularity, the racoon trap 10 of this invention comprises a rectangular housing of steel or the like with bottom wall 12, top wall 14 and side walls 16. Doors 18 and 20 may be hinged at the end to close off the housing and a chain 22 is attached to anchor the housing as desired.

After baiting in the manner to be described the trap is normally buried with just an opening 24 in the top wall 14 exposed to provide the animal access to the bait. It should be noted that the access opening 24 is a small hole, not large enough to receive the legs or paws of large dogs and cats, as well as larger animals. Slide rails 26 are provided in the side walls 16 just below the top wall 14 and a sliding gate 28 is carried on the slide rails 26 and urged toward the right in the drawings by strong springs 30. Hence, when the trap 10 is set, the slide at 28 is held in the position shown in FIG. 3 and, when released, it snaps toward the position shown in FIGS. 1 and 2, i.e. toward a stop 32, effectively gripping an animal's paw extended through the opening 24.

Pivoted at 34 to the bottom of the slide 28 is a depending arm 36 carrying an upturned hook 38. Pivoted at 40 to the side walls 16 is a trigger arm 41, 42 having an upturned end 44 that engages and holds the lower end of the depending arm 36 when the trap 10 is set as shown in solid lines in FIG. 3. A stop member 46 is carried on the other end 41 of the trigger arm 41, 42 to restrict downward movement thereof, and tines or the like 47 are provided to attach a mass of bait B. It will be apparent, particularly from FIG. 3, that the depending arm 36 which holds the slide plate 28 fulcrumed against a cross rod 48 extending between the sides 16, can only be released by raising the right side of the trigger arm 41, i.e. by lifting the bait B. Any downward force on the right side 41, as by a small pet or other animal stepping on it, will have no effect and will not release the depending arm 36; it can only be released by raising the bait B.

Figure 2:
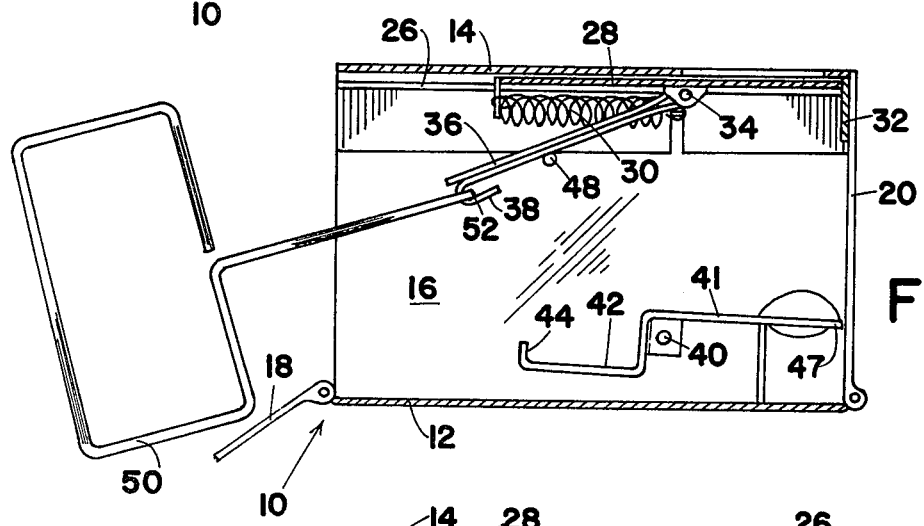
FIG. 2 is a section view showing the method of setting a trap.
Figure 3:
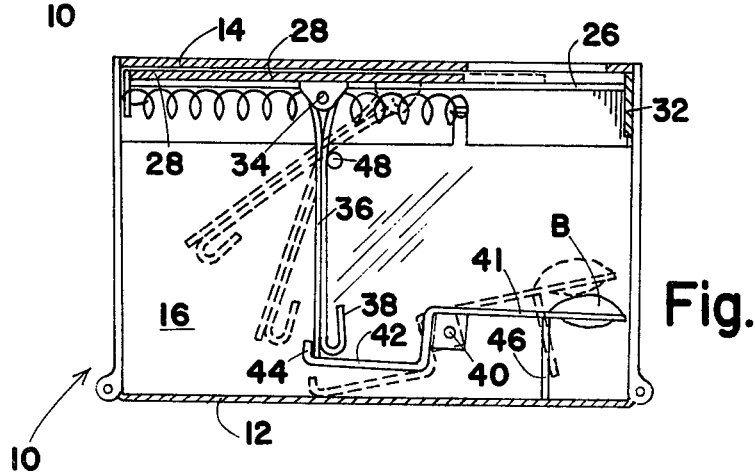
FIG. 3 is a vertical section view of the trap showing the latch mechanism.

In setting the trap, as shown in FIGS. 2 and 3 one may use a tool 50 having a hook 52 at the end to engage the hook 38 on the arm 36. After the trap is baited at 48, the arm 36 is pulled to the left to retract the slide plate 28 then, the arm 36 is pushed forward, levered about the fulcrum rod 48 to the position shown in FIG. 3 wherein it is engaged behind the upturned end 44 of the latch arm 41, 42. The trap 10 is then buried with the opening 24 exposed to provide access to the bait B. When a racoon lifts the bait the latch arm 36 is released as shown in FIG. 3 and the slide plate 28 is thrust to the right to firmly grip the racoon's paw.

While this invention has been described in conjunction with a preferred embodiment thereof, it is obvious that modification and changes therein may be made by those skilled in the art to which it pertains without departing from the spirit and scope of this invention, as defined by the claims appended hereto.

What is claimed as invention is:

1. An animal trap comprising:
    a housing including a top panel;
    means forming an opening in said top panel of a size to receive closely the paw of a small animal;
    a slide plate mounted in said housing for movement along the undersurface of said top panel between a set and sprung position, respectively displaced from and underlying said opening;
    strong spring means biasing said slide plate into said sprung position;
    a trigger arm in said housing pivoted between the ends thereof about a horizontal axis;
    bait attaching means at one end of said trigger arm beneath said opening;
    first latch means at the other end of said trigger arm; and
    complementary latch means carried on said slide plate;
    said first latch means being engagable when said one end of the trigger arm is depressed and being disengaged when said one end is raised.

2. The animal trap defined by claim 1 wherein:
    said other end of the trigger arm is turned to form said first latch means;
    said complementary latch means comprising:

a depending arm pivoted at the upper end thereof to said slide plate;
  said depending arm being of a length to engage said other end of the trigger arm against said first latch means; and
  a transverse bar in said housing about which said depending arm is pivoted to pull said slide into said set position and engage said first latch means.
3. The animal trap defined by claim 2 including:
  stop means on said trigger arm to limit downward movement of said one end thereof.
4. The animal trap defined by claim 2 including:
  a first hook on the lower end of said depending arm;
  a hand tool having a handle and a rigid bar thereon;
  a second hook on the end of said bar engageable with said first hook to pull said depending arm and slide to said set position and then to push said arm about said transverse bar downward and toward said trigger arm to be engaged by said upturned other end thereof.
5. The animal trap defined by claim 2 wherein:
  said housing is of tubular configuration, rectangular in cross-section; and including:
  doors mounted at both ends of said housing.

* * * * *